United States Patent [19]

Miyagi

[11] 4,429,358
[45] Jan. 31, 1984

[54] FLYBACK TRANSFORMER

[75] Inventor: Toshimi Miyagi, Nagaokakyo, Japan

[73] Assignee: Murata Manufacturing Co., Ltd., Japan

[21] Appl. No.: 343,395

[22] Filed: Jan. 28, 1982

[30] Foreign Application Priority Data

Feb. 12, 1981 [JP] Japan .................................. 56-19759

[51] Int. Cl.³ ........................ H01F 15/10; H02M 7/06
[52] U.S. Cl. ..................................... 363/68; 363/126; 336/185; 336/208
[58] Field of Search .................. 363/68, 126, 144–146; 336/185, 192, 198, 208; 315/411

[56] References Cited

U.S. PATENT DOCUMENTS

| | | | |
|---|---|---|---|
| 4,091,349 | 5/1978 | Niederjohn et al. | 363/68 X |
| 4,204,263 | 5/1980 | Onove | 363/126 X |
| 4,274,136 | 6/1981 | Onodera et al. | 363/68 |
| 4,361,867 | 11/1982 | Frister et al. | 363/145 |

Primary Examiner—Peter S. Wong
Attorney, Agent, or Firm—Ostrolenk, Faber, Gerb & Soffen

[57] ABSTRACT

A flyback transformer comprising a primary winding wound onto a core, secondary windings wound in magnetic coupling with the primary windings, and diodes connected to the secondary windings respectively, each diode being mounted on the peripheral surface of a bobbin on which the secondary windings are wound and supported thereto through lead wires fitted into grooves provided at supports projecting from the peripheral surface of the bobbin, thereby simplifying the manner in which the diode is mounted to the bobbin and making it easier to automate both the diode mounting and the connecting of terminals of the secondary windings with the lead wires.

6 Claims, 8 Drawing Figures

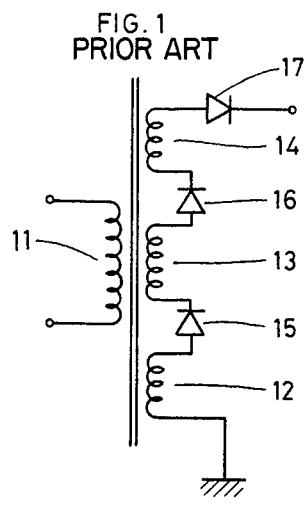
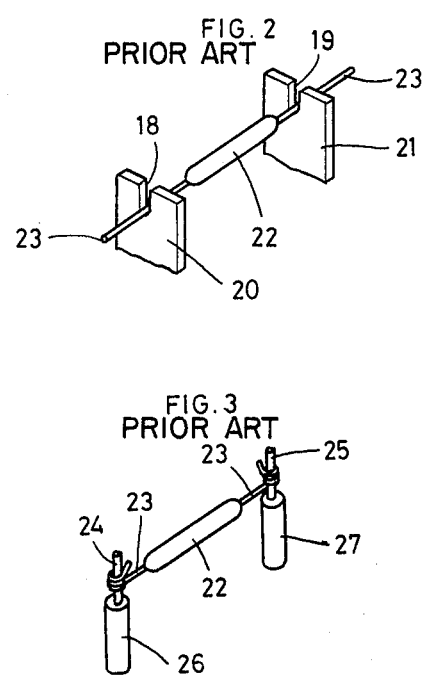
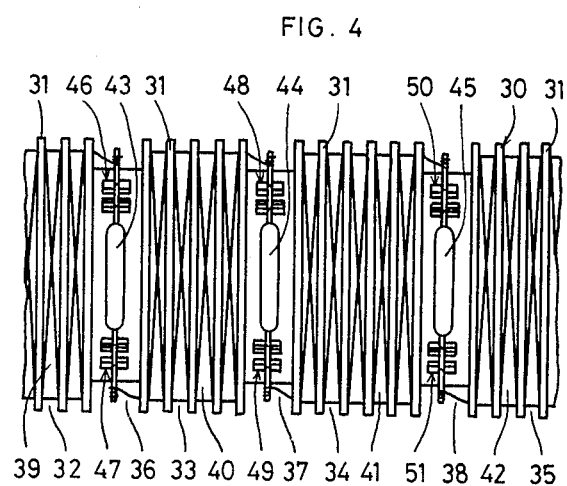

FLYBACK TRANSFORMER

BACKGROUND OF THE INVENTION

This invention relates to a flyback transformer for supplying a DC high voltage to a cathode-ray tube at a television receiver or the like, and more particularly to a flyback transformer having an improved construction to mount to coil bobbin diodes connected to the secondary windings.

Recently, various flyback transformers of the so-called diode-split type have been proposed which, as shown in the equivalent circuit in FIG. 1, comprise a plurality of split secondary windings 12, 13, 14 which are magnetically coupled to the primary winding 11 and a plurality of diodes 15, 16, 17 connected alternately in series to respective primary windings.

Such flyback transformers each are so constructed that a secondary winding bobbin is provided with a plurality of flanges, a plurality of coil winding grooves, and a plurality of diode insertion grooves, so that secondary windings are wound into the coil winding grooves and diodes are disposed into the diode insertion grooves, respectively.

Conventionally, several mounting means have been adopted to dispose the diodes into the diode insertion grooves, two different examples of which are shown in FIGS. 2 and 3.

Referring at first to FIG. 2, a pair of supports 20, 21 having upper cutouts 18, 19, respectively, are formed integrally with the diode insertion groove at the secondary winding bobbin, and a diode 22 is inserted with its lead wires 23 being placed into the cutouts 18, 19. Thereafter the supports 20, 21 are fused in the vicinity of cutouts 18, 19, so as to prevent the diode 22 from escaping.

Next, in FIG. 3, at the diode insertion groove at the secondary winding bobbin are formed a pair of supports 26, 27 providing upper terminal pins 24, 25 and integral with the bobbin, the terminal pins 24, 25 being wound with lead wires 23 of the diode 22 and soldered at the winding portions, thereby fixing lead wires 23 to the pins 24, 25, respectively.

In the mounting means in FIG. 2, the fusion of support can prevent the diode 22 from escaping, but the diode is not fixed to the supports, thereby making it difficult to connect the lead wires to terminals of secondary winding due to rolling or laterally shifting of the diode 22.

The mounting means shown in FIG. 3 requires a surplus work of attaching the terminal pins to the supports and the diode lead wires should be wound around the terminal pins which results in inconvenience of complicated work.

Furthermore, the connection process of each of the foregoing structures are difficult to automate.

In addition, other various means have been proposed, which are defective similarly to the above.

BRIEF DESCRIPTION OF THE INVENTION

An object of the invention is to provide a flyback transformer which simplifies the mounting of the diode.

Another object of the invention is to provide a flyback transformer which makes it easy to connect terminals of secondary winding with lead wires of the diode thereby making it possible to automate connecting process.

Still another object of the invention is to provide a flyback transformer which ensures the proper fixing of the diode to the supports.

The foregoing and other objects of the invention are achieved by utilizing a flyback transformer comprising:
 a core;
 a primary winding wound through a primary winding bobbin onto the core;
 a secondary winding wound on a secondary winding bobbin and magnetically coupled to the primary winding; and
 a diode connected to the secondary winding, said diode having opposite lead wires each being bent into a U- or V-like shape;
 the transformer being provided at a peripheral surface of the secondary winding bobbin with at least a pair of supports for the diode, the supports being provided with jig insertion grooves extending at an angle other than 90° to the axis of the secondary winding bobbin and defining inner surface portions of the supports;
 a lead wire insertion groove being formed in at least one inner surface portion of each support and extending in the projecting direction of the support, each lead wire insertion groove having a width slightly smaller than a diameter of the diode lead wires;
 the U- or V-like shape portions of the lead wires being inserted into respective lead wire insertion grooves so that at least one of the lead wires is connected to terminals of the secondary winding.

BRIEF DESCRIPTION OF THE DRAWINGS

Other objects and aspects of the invention will become apparent from the following description of the embodiment with reference to the accompanying drawings in which:

FIG. 1 is an equivalent circuit diagram of a flyback transformer,

FIG. 2 is a perspective view explanatory for a mounting means for a diode in the principal portion of a conventional flyback transformer, FIG. 3 is a perspective view of a principal portion at a different example of the conventional diode mounting means, FIG. 4 is a plan view of a principal portion of a preferred embodiment of the invention.

DETAILED DESCRIPTION OF THE INVENTION

Figure 5:
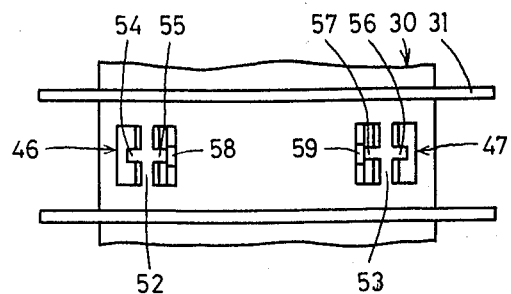
FIG. 5 is a plan view of a principal portion of a secondary winding bobbin, illustrating supports for the diode.

Referring to FIG. 4, the principal portion of the secondary winding unit of the flyback transformer, in which the secondary winding units together with a primary winding are mounted through a primary winding bobbin onto a core, are shown. Construction of the core and primary winding and primary winding bobbin is not important to the invention, and have, therefore been omitted from the drawing and description.

In the drawings, reference numeral 30 designates a secondary winding bobbin which has a plurality of flanges to form coil winding grooves 32, 33, 34 and 35 which alternate with diode insertion grooves 36, 37 and 38, each of the coil winding grooves 32, 33, 34 and 35 comprising a plurality of grooves; numerals 39, 40, 41 and 42, designate a plurality of secondary windings wound onto the coil winding grooves 32, 33, 34 and 35, respectively; and 43, 44 and 45, designate a plurality of diodes insertably mounted into the diode insertion grooves 36, 37 and 38, respectively, lead wires of the diodes being connected to terminals of the secondary windings 39 to 42, respectively.

The diodes 43, 44 and 45 are supported by respective pairs of supports 46 and 47, 48 and 49, and 50 and 51 projecting from the outer peripheral surface of the bobbin at the diode insertion grooves.

Figure 6:
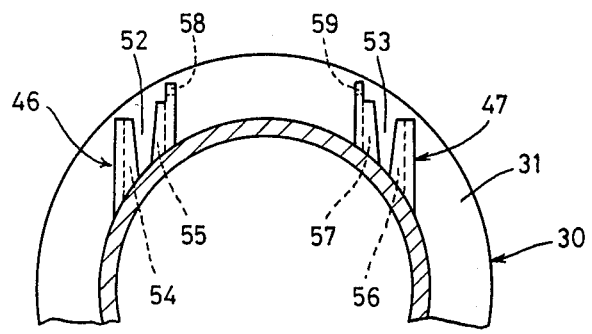
FIG. 6 is a sectional view of a principal portion of the secondary winding bobbin, illustrating the supports for the diode.

FIGS. 5 and 6 are views explanatory of construction of the above supports, in which a pair of supports 46 and 47 only are shown. The remaining supports are omitted from the drawing and description because they are similar in construction to supports 46 and 47. In FIGS. 5 and 6, reference numerals 52 and 53 designate grooves formed at the pair of supports 46 and 47 and tapered toward the peripheral surface of the bobbin respectively. The grooves 52 and 53 are parallel to the axis of bobbin 30, but may be non-parallel as long as they are not perpendicular to the axis of bobbin 30. Numerals 54, 55, 56 and 57, designate lead wire insertion grooves formed at the inner surfaces of grooves 52 and 53 in the projecting direction of the supports 46 and 47 from the peripheral surface of bobbin 30, the grooves 54 through 57 each having a width slightly smaller than a diameter of the diode lead wire. Numerals 58 and 59 designate lead wire receiving grooves, which have a width equal to or slightly larger than a diameter of the lead wire of diode and formed at the upper portions of opposite parts of supports 46 and 47 divided into two parts by grooves 52 and 53, respectively.

In addition, the supports 46 and 47 have at the upper portions thereof the predetermined stepped portions which prevent the respective supports 46 and 47 from coming out of each flange 31, the stepped portions being optional.

Figure 7:
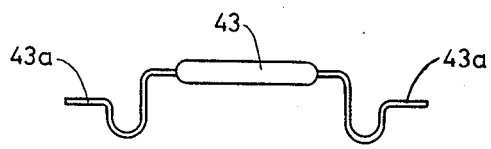
FIG. 7 is a front view of the diode.
Figure 8:
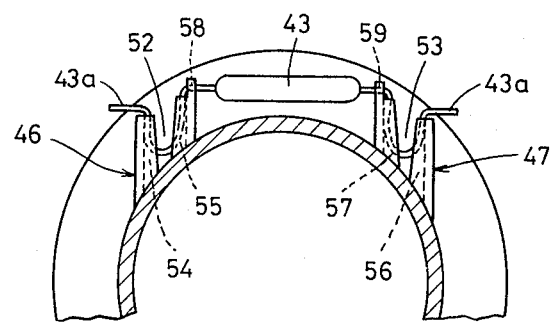
FIG. 8 is a sectional view of the secondary winding bobbin, showing a mounting condition of diode to the supports.

Diode 43 having lead wires 43a each bent in a U-like shape (or alternatively in a V-like shape) as shown in FIG. 7, are inserted at the pair of lead wires 43a in the vicinity of the diode body into lead wire receiving grooves 58, 59, the lead wires 43a being fitted at both legs of U-like-shaped portion into two pairs of lead wire insertion grooves 54 and 55, and 56 and 57, respectively.

In brief, the lead wires 43a of diodes 43 being in U- or V-like shape are fitted into grooves 52 and 53 of supports 46 and 47, respectively, in which the U-like-shaped portions of lead wires 43a are positioned above the grooves 52 and 53 and pushed at the bottoms from above by use of a jig, thereby being fitted into the grooves 52 and 53 together therewith.

The jig is removed after the lead wire 43a is fitted into the lead wire insertion groove. In addition, other diodes 44 and 45 are supported to other supports 48, 49, 50 and 51 constructed as the same as supports 46 and 47, thereby forming the secondary winding unit.

The secondary winding unit constructed as the above, together with the primary winding wound to the primary winding bobbin are housed in an insulating case, then molded by an insulating material such as epoxy resin and thereafter mounted on the core, thus completing the flyback transformer of the invention, which of course is not limited to the aforesaid embodiment.

For example, the lead wire insertion grooves 54 and 56 at the outside portions of supports 46 and 47 divided into two parts by the grooves 52 and 53 may each have a larger width than a diameter of each lead wire, or may be omitted. In this instance, the lead wires 43a of diode 43 need not be bend in U-like shape as shown in FIG. 7, but may be placed above the supports 46 and 47 as they are straight and when pushed into the grooves by the jig, free ends of the wires 43a are pulled down, so that the lead wires 43a are bent in a U- or V-like shape and fitted into a desired lead wire insertion groove.

Alternatively, the respective lead wire insertion grooves 55 and 57 at the inside portion of each support 46 or 47 divided into two parts by the grooves 52 and 53 may have a larger width than a diameter of lead wire 43a of diode 43, or may be omitted. In this instance, the lead wires 43a of diode 43 has to be bent previously in a U- or V-like shape a the former embodiment.

Furthermore, the lead wire receiving grooves 58 and 59 at the upper portions of supports 46 and 47 may be omitted. Also, in the aforesaid embodiment grooves 52 and 53 are provided with taper to narrow peripheral surface of the bobbin, thus facilitating and ensuring the insertion of the lead wire together with the jig and making the insertion easier as a result of the gap between lead wire receiving groove and insertion jig becoming narrower near the peripheral surface of the bobbin, but the tapered inner surfaces, while preferable, are optional. Also, the groove 52 and 53 need not be formed until reaching the peripheral surface of the coil bobbin. The above constructions are applicable to other supports.

Each diode 43, which is disposed about in parallel to the secondary winding, may alternatively be tilted in the diode insertion groove to earn a creeping distance for the secondary winding, in which the supports 46 and 47 are enough to be tilted along the diode 43.

The above description concerns the flyback transformer comprising a plurality of secondary windings disposed alternately in series to a plurality of diodes as shown in FIG. 4. This invention, however, is not limited to such construction, but applicable to a flyback transformer of the commutation type which has one diode connected only to the output terminal of secondary winding, or to a flyback transformer of commutation type in which diodes are respectively connected to both terminals of secondary winding.

While a preferred embodiment of the invention has been described using specific terms, such description is for illustrative purpose only, and it is to be understood that changes and variation may be made without departing from the spirit or scope of the following claims.

What is claimed is:

1. A flyback transformer comprising:
  a core;
  a primary winding wound through a primary winding bobbin onto said core;
  a secondary winding wound on a secondary winding bobbin and magnetically coupled to said primary winding; and
  a diode connected to said secondary winding, said diode having opposite lead wires each being bent into a U- or V-like shape;
  said transformer being provided at a peripheral surface of said secondary winding bobbin with at least a pair of supports for said diode, said supports being provided with jig insertion grooves extending at an angle other than 90° to the axis of said secondary winding bobbin and defining inner surface portions of said supports;

a lead wire insertion groove being formed in at least one said inner surface portion of each said support and extending in the projecting direction of said support, each said lead wire insertion groove having a width slightly smaller than a diameter of said diode lead wires;

the U- or V-like shape portions of said lead wires being inserted into respective said lead wire insertion grooves so that at least one of said lead wires is connected to terminals of said secondary winding.

2. A flyback transformer according to claim 1, wherein each of said supports for said diode is provided with a said lead wire insertion groove at only one said inner surface portion thereof.

3. A flyback transformer according to claim 1, wherein each of said supports for said diode is provided with a pair of said lead wire insertion grooves at opposite inner surface portions thereof.

4. A flyback transformer according to claim 1, wherein said jig insertion grooves are tapered toward the peripheral surface of said secondary winding bobbin.

5. A flyback transformer according to claim 1, wherein each of said supports for said diode is provided at an upper portion thereof with a receiving groove into which a respective said lead wire is fitted.

6. A flyback transformer according to claim 1, wherein the secondary windings and diodes are plural in number, said secondary windings and diodes being alternately disposed in series.

* * * * *